(12) United States Patent
Holland et al.

(10) Patent No.: US 7,282,092 B2
(45) Date of Patent: *Oct. 16, 2007

(54) FIRE RESISTANT GLAZINGS

(75) Inventors: John Richard Holland, Ormskirk (GB); Karikath Sukumar Varma, Merseyside (GB); David William Holden, Wigan (GB)

(73) Assignee: Pilkington PLC, St. Helens (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/146,925

(22) Filed: Jun. 7, 2005

(65) Prior Publication Data

US 2006/0254465 A1    Nov. 16, 2006

Related U.S. Application Data

(63) Continuation of application No. 10/048,862, filed on Apr. 25, 2002, now Pat. No. 6,929,691.

(51) Int. Cl.
*C04B 12/04* (2006.01)

(52) U.S. Cl. ............... 106/635; 106/287.1; 106/287.19

(58) Field of Classification Search ................ 106/635, 106/287.1, 287.19; 428/428
See application file for complete search history.

(56) References Cited

U.S. PATENT DOCUMENTS

| 4,294,627 A | * | 10/1981 | Heyes | 148/247 |
| 5,086,149 A | * | 2/1992 | Baron et al. | 528/45 |
| 5,766,770 A | * | 6/1998 | Nolte et al. | 428/428 |

FOREIGN PATENT DOCUMENTS

| JP | 51-69519 A | * | 6/1976 |
| JP | 5-117043 A | * | 5/1993 |

* cited by examiner

*Primary Examiner*—Anthony J. Green
(74) *Attorney, Agent, or Firm*—Marshall & Melhorn, LLC

(57) ABSTRACT

Novel waterglass compositions comprise a zirconium containing anionic aggregate, preferably potassium zirconium carbonate or ammonium zirconium carbonate, in a quantity sufficient to provide at least 0.5% as zirconium metal. The compositions can be dried and/or gelled to form optically clear interlayers useful in the production of fire resistant glass laminates. The incorporation of the zirconium containing aggregate improves the fire resistant performance of the laminates.

10 Claims, No Drawings

FIRE RESISTANT GLAZINGS

This application is a continuation of U.S. application Ser. No. 10/048,862, filed on Apr. 25, 2002, which has since issued as U.S. Pat. No. 6,929,691. U.S. application Ser. No. 10/048,862 is hereby incorporated by reference as if set forth in its entirety herein.

BACKGROUND OF THE INVENTION

1. Field of the Invention

This invention relates to novel waterglass compositions and to fire resistant glass laminates comprising an intumescent layer between two opposed panes of glass which layer may be produced by drying a waterglass composition on the surface of the glass.

2. Discussion of Related Art

Glass laminates incorporating an intumescent inorganic silicate layer sandwiched between two opposed panes of glass are sold under the trade marks PYROSTOP and PYRODUR by the Pilkington group of companies. When such laminates are exposed to a fire the inorganic layer intumesces and expands to form a foam. The foam provides a thermally insulating layer which protects the pane of glass remote from the fire so that the structural integrity of the glass unit is maintained and thereby presents a barrier to the propagation of the fire for a longer period. The insulating properties of the foam layer also reduce the amount of heat transmitted through the laminate and thereby reduce the risk of combustion of materials on the non-fire side of the glass. Glass laminates incorporating such intumescent layers have been successfully used as fire resistant glass structures. Such laminates may comprise more than two panes of glass sandwiching more than one intumescent layer. Laminates comprising up to eight intumescent layers have been employed. These multi-layered laminates are relatively thick and correspondingly expensive.

The intumescent inorganic layer is normally formed mainly from a sodium silicate waterglass or a mixture thereof with a potassium silicate waterglass. In addition the layer may comprise a minor quantity of a polyhydric organic compound such as a glycol, glycerine or its derivatives or a sugar. The intumescent inorganic layer is most commonly formed by preparing a solution of the waterglass, spreading that solution on the surface of the glass and drying excess water from the solution so as to form the inorganic layer.

U.S. Pat No. 5,766,770 describes fire resistant glass structures based upon an interlayer formed from a mixture of a sodium silicate waterglass and a potassium silicate waterglass. This disclosure also teaches that it would be advantageous to introduce a minimum of 5% by weight of sub-microscopic particles of an inorganic compound or a metallo organic compound of silicon, aluminium, titanium or zirconium into the intumescent layer in order to increase the viscosity thereof on foaming. The introduction of any particulate material into the waterglass layer is not desirable since the interlayer formed when the waterglass is dried may be hazy or become hazy during the lifetime of the glazing and such glazings are not commercially acceptable.

U.S. Pat. No. 5,766,770 mentions the idea of introducing a metallo organic compound of silicon, aluminium, titanium or zirconium into the waterglass layer but does not disclose any composition containing such a metallo organic compound. To be useful in such a composition the metallo organic compound must be compatible with the waterglass. Many metallo organic compounds are wholly incompatible with the waterglass. One example is zirconium acetate which forms an insoluble white precipitate which is believed to comprise oligomeric zirconium oxide species when added to a waterglass solution. There has no prior disclosure of a waterglass solution comprising a zirconium compound or the use of such a solution to form a fire resistant interlayer.

BRIEF SUMMARY OF THE INVENTION

We have now discovered that this problem of the compatibility of zirconium compounds with a waterglass solution may be overcome by introducing the zirconium in the form of a zirconium containing compound which forms an anionic aggregate in the waterglass solution. Thus from one aspect this invention provides a clear solution comprising at least one silicate waterglass and at least one zirconium containing anionic aggregate.

DESCRIPTION OF THE PREFERRED EMBODIMENT

The zirconium containing aggregates are oligomeric or polymeric species having an overall negative charge. In order to have this overall negative charge they should comprise a group which can be deprotonated in the aqueous waterglass solution as part of their molecular structure. It is this deprotonation which lends anionic character to the aggregate and this anionic character contributes to making the aggregate compatible with the anionic polysilicate species which comprise the bulk of the silicate species in a waterglass solution.

Not all such aggregates are fully compatible with the waterglass solution, and the compatibility of each may be determined by routine testing. In particular some aggregates which are compatible with the initial dilute waterglass solution may be less compatible with the more concentrated waterglass solution produced by the removal of excess water and/or may not be compatible with the waterglass over an extended period of use primarily due to their solubility and/or dispersibility at reduced water concentrations. The quantity of any aggregate which is compatible with the waterglass should preferably be such as to impart significantly improved properties to the interlayer during exposure to high temperature in a fire.

A preferred group of zirconium containing anionic aggregates potentially useful in the compositions of this invention are those which can be represented by the general formula

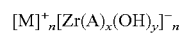

wherein M represents a water soluble cation; A represents a ligand which has anionic character in an aqueous waterglass solution; x has an average value of from 1 to 6, y has an average value of from 2 to 6 and n has an average value of from 1 to 10 preferably an average value of from 1 to 6.

The ligand A exhibits anionic character by virtue of being deprotonisable in an aqueous waterglass solution. The preferred ligands A are selected from the group comprising carbonate ions and the anions of alpha hydroxy carboxylic acids such as lactic acid, glycolic acid, malic acid, mandelic acid and citric acid. The most preferred ligands A are carbonate ions and citrate ions.

The preferred water soluble cations are alkali metal ions especially sodium ions, potassium ions; and ammonium ions including substituted ammonium ions. Polyvalent metal cations may also be used in place of the monovalent $M^+$ cations provided the aggregate comprising them is sufficiently compatible with the waterglass solution.

The average value of x will preferably be in the range 2 to 6 and most preferably in the range 2 to 4. The average value of y is preferably in the range 2 to 4.

A particularly preferred group of zirconium containing aggregates useful in the compositions of the present invention comprises those compounds sold as potassium zirconium carbonate and ammonium zirconium carbonate. Potassium zirconium carbonate is sold under the Trade Mark ZIRMEL 1000 by MEL Chemicals Limited as an aqueous solution comprising approximately 20% w/w $ZrO_2$; 12% w/w $K_2O$ and 18% w/w carbonate and ZIRMEL 1000 is an especially preferred aggregate for use in the compositions of this invention.

Another preferred group of zirconium containing aggregates useful in the compositions of this invention are the salts of the organo zirconium complexes which are described in or can be produced using the processes described in British patent application Ser. No. 2,226,024A. This patent application describes the production of zirconium complexes derived from alpha hydroxy carboxylic acids such as lactic acid, glycolic acid, malic acid, mandelic acid and citric acid and polyols such as glycerol, erythritol, arabitol, xylitol, sorbitol, dulcitol, mannitol, inositol, glucose, fructose, mannose, galactose, lactose and maltose.

These complexes are obtained by reacting the polyol and/or the alpha hydroxycarboxylic acid with a zirconium halide in solution and neutralising any acidic byproducts formed during the reaction. Conveniently the zirconium halide is added to a solution comprising the other reactants and sufficient alkali is added to ensure that the solution is alkaline. Other zirconium containing complexes which behave as anionic aggregates in a waterglass solution may be obtained using analogous procedures.

Applicants have discovered that the solubility of the zirconium aggregates in an aqueous alkaline medium may vary with pH and may reach a maximum at a pH value in the range 9.0 to 12.5. Applicants have also discovered that whilst the addition of alkali to an acidic or neutral solution of a zirconium compound may initially result in the formation of a precipitate, that precipitate may redissolve upon addition of further alkali. It may be necessary to employ vigorous stirring and to add the alkali in a controlled manner if the precipitate is to be redissolved or in order to avoid the formation of a precipitate which is insoluble and will not redissolve. The pH of an aqueous solution of a zirconium containing aggregate useful as an additive to a waterglass solution will preferably be in the range 9 to 13 more preferably in the range 11 to 13.

The amount of zirconium which can be added to a waterglass solution will normally be limited by the compatibility of the particular zirconium containing aggregate with the particular waterglass solution. In order to exert the preferred effect upon the fire resistant properties of the intumescent layer it is preferred that the waterglass solution comprises at least 0.5% and more preferably 1.0% by weight of zirconium (expressed as percent by weight of zirconium metal). Generally it is preferred to incorporate as high a concentration of zirconium as is possible without producing an unstable solution or a dried interlayer which is not optically clear. The instability of the solution may manifest itself in the precipitation of solid material (which is believed to be zirconium oxide) or in the formation of a dried intumescent silicate layer which is not optically clear. Either is unacceptable and only those solutions which are stable and clear and/or those which can provide an optically clear dried intumescent layer are useful in this invention.

The zirconium containing aggregate should be mixed with the waterglass solution in a manner which avoids the formation of a precipitate. Preferably the solutions are mixed under conditions which avoid highly alkaline conditions. Generally a solution of the zirconium containing aggregate should be added slowly to the waterglass solution with vigorous mixing so as to avoid the production of local areas of high pH.

In a preferred embodiment of the invention the waterglass solution further comprises a minor quantity of a polyhydric compound such as a glycol, glycerine or a derivative of glycerine or a sugar. The preferred polyhydric compound is glycerol. The polyhydric compounds appear to aid the dissolution of the zirconium containing aggregates and to improve the stability of the solutions most probably through a mechanism involving hydrogen bonding. The addition of a polyhydric compound may thereby increase the quantity of zirconium which can be incorporated into a particular waterglass solution. The solutions preferably comprise at least 5% by weight of polyhydric compound and usually not more than 20% by weight of polyhydric compound.

In these embodiments the waterglass solution may conveniently be produced by adding the solution of the zirconium compound to at least a part of the glycerol and subsequently adding the solution produced by this addition to the waterglass solution.

The waterglass solution to which the zirconium compound is added is an alkaline system. The pH varies according to the composition of the waterglass. The composition of the silicate waterglass may vary through a wide range. Waterglasses used heretofore to form intumescent interlayers commonly comprise a ratio of $SiO_2:M_2O$ of approximately 3.4:1.0 although waterglasses having a ratio of $SiO_2:M_2O$ as high as 6.0:1.0 have been proposed as being useful. The pH of such waterglass solutions varies from 9 to 13. In the preferred embodiments the waterglass is a sodium silicate waterglass, i.e. all the cations M represent sodium ions. However other useful waterglass solutions comprise a mixture of a sodium-silicate waterglass and a potassium silicate waterglass.

The water content of the solution immediately after the dissolution of the zirconium containing aggregate will generally be not more than 70% by weight. These relatively dilute solutions may be dried to form an intumescent interlayer which preferably comprises not more than 30% by weight of water and preferably not less than 15% by weight of water The inorganic intumescent layers may conveniently be produced by spreading the waterglass solution onto the surface of a sheet of glass and subsequently evaporating water from the solution. In order to produce an inorganic intumescent layer of the desired thickness upon the glass it is necessary to provide an edge barrier on the glass which will retain the waterglass solution during the evaporation step. The edge barrier may be produced from a mixture of glass powder, water and methyl cellulose using the compositions and techniques described in European Patent application 705686. The evaporation of water from the waterglass solution is preferably carried out by drying it in an oven at a temperature of from 70 to 110° C. for a period of from 12 to 24 hours.

When the interlayer is produced by removing excess water the rate of evaporation of the water may conveniently be controlled by varying the relative humidity in the atmosphere. By maintaining a very high relative humidity (up to 100 RH) during the initial part of the drying step the rate of drying may be maintained at a relatively low level. Later in the process the Relative Humidity may be reduced in order to increase the rate of drying.

When the evaporation is complete the coated glass sheet may be removed from the oven and the retaining edge barrier removed by cutting the edges from the sheet. The resulting product is a glass sheet having an inorganic intumescent layer upon one surface thereof. The thickness of the dried interlayer may vary through a wide range say from 0.3 to 5.0 mm. Generally thicknesses of from 0.5 to 2.5 mm are preferred.

The glass sheets with the coating can be used to produce a variety of fire resistant glazings. A second sheet of glass may be bonded to the dried interlayer to produce a simple laminate. Alternatively a second sheet of glass having a dried intumescent interlayer can be bonded to the first and then a top sheet can be added to form a laminate having two intumescent interlayers. This process can be continued to produce however many interlayers are desired. Another alternative is to bond the second sheet with the interlayers in contact with one another and thus form a single interlayer having twice the thickness of the original.

The glass sheets used to form these laminates will normally be conventional sheets of soda-lime float glass. However other glass compositions may be employed in particular those having a higher strain temperature as these will increase the fire resistance of the laminate. Coated glasses in particular those having a coating which reflects heat may also be used.

Fire resistant glazings comprising at least one optically clear intumescent interlayer comprising a silicate waterglass which comprise at least 0.5% by weight (expressed as % by weight of zirconium metal) are believed to be novel and constitute a further aspect of this invention.

The invention is illustrated by the following examples.

EXAMPLE 1

A transparent fire resistant glazing was made by taking a pane of 3 mm thick soda lime glass and applying a moisture and heat proof barrier around its circumference to form a 10 to 15 mm deep dish.

A solution was made up by 3 parts by weight of a 50% aqueous solution of potassium zirconium carbonate (as sold under the Trade Mark ZIRMEL 1000 by MEL Chemicals of Manchester England) with 6.0 parts by weight of glycerol and 0.9 parts by weight of water. This solution was thoroughly mixed and then added slowly with vigorous stirring to 90.1 parts by weight of an aqueous waterglass solution comprising 38.1% by weight of a sodium silicate having an $SiO_2:Na_2O$ ratio of 3.3:1. The mixed solution was poured onto the glass at a loading of 5 kg/m².

The glass was dried in an oven at 100° C. under conditions of controlled humidity to a water content of 20 to 30% of a thickness of approximately 1.4 mm. The edge barrier was removed and a second pane of soda lime glass of 3 mm thickness was bonded to the dried waterglass layer.

The laminated glass, in the form of a test sheet measuring 2 m by 1 m, was tested under the conditions of BS476 part 22 and failed after 55 minutes. Equivalent laminates not comprising a zirconium containing aggregate fail the same test after a period of approximately 30 minutes.

The invention claimed is:

1. A clear solution comprising at least one silicate waterglass and at least one zirconium containing anionic aggregate represented by the formula $$[M]_n^+[Zr(A)_x(OH)_y]_n^-$$

wherein M represents a water soluble cation; A represents a ligand which has anionic character in an aqueous waterglass solution; x has an average value of from 1 to 6; y has an average value of from 2 to 6; and n has an average value of from 1 to 10, wherein the waterglass solution has a pH between 9 and 13.

2. A solution according to claim 1, wherein the ligand A is a carbonate ion or an anion of an alpha hydroxyl carboxylic acid.

3. A solution according to claim 1, wherein A represents a carbonate ion or a citrate ion.

4. A solution according to claim 1, wherein M represents an alkali metal ion, an ammonium ion or a substituted ammonium ion.

5. A solution according to claim 1, wherein x has an average value in the range 2.0 to 6.0.

6. A solution according to claim 1, wherein y has an average value in the range 2.0 to 4.0.

7. A solution according to claim 1, wherein the zirconium containing aggregate is potassium zirconium carbonate or ammonium zirconium carbonate.

8. A solution according to claim 1, further comprising a polyhydric organic compound.

9. A solution according to claim 8, wherein the polyhydric compound is glycerol.

10. A solution according to claim 1, wherein the water has a water content which is not more than 70% by weight.

* * * * *